United States Patent [19]

Otterbein

[11] Patent Number: 4,461,733

[45] Date of Patent: Jul. 24, 1984

[54] CAPILLARY FIN MEDIA

[75] Inventor: Roy T. Otterbein, Phoenix, Ariz.

[73] Assignee: Arvin Industries, Inc., Columbus, Ind.

[21] Appl. No.: 485,200

[22] Filed: Apr. 15, 1983

Related U.S. Application Data

[63] Continuation-in-part of Ser. No. 479,127, Mar. 28, 1983.

[51] Int. Cl.³ .............................................. B01F 3/04
[52] U.S. Cl. .................... 261/153; 165/166; 261/154; 261/112; 261/DIG. 44; 261/DIG. 3; 261/158
[58] Field of Search ............... 261/DIG. 3, DIG. 77, 261/158–161, 153, 154, DIG. 44, 106; 165/166; 261/112

[56] References Cited

U.S. PATENT DOCUMENTS

| | | | |
|---|---|---|---|
| 2,044,352 | 6/1936 | Evans | 62/6 |
| 2,174,060 | 9/1939 | Niehart | 261/161 |
| 2,321,110 | 6/1943 | Shipman | 165/166 |
| 2,596,642 | 5/1952 | Boestad | 165/166 |
| 2,697,588 | 12/1954 | Jensen | 165/166 |
| 2,825,210 | 3/1958 | Carr | 165/166 |
| 3,025,685 | 3/1962 | Whitlow | 62/139 |
| 3,286,999 | 11/1966 | Takeda | 261/30 |
| 3,476,179 | 11/1969 | Meister et al. | 165/166 |
| 3,683,591 | 8/1972 | Glav | 55/34 |
| 3,733,063 | 5/1973 | Loetel et al. | 261/112 |
| 3,757,855 | 9/1973 | Kun et al. | 165/166 |
| 3,880,231 | 4/1975 | Gauthier | 165/166 |
| 3,963,810 | 6/1976 | Holmberg et al. | 261/112 |
| 3,995,689 | 12/1976 | Cates | 261/158 |
| 4,002,040 | 1/1977 | Munters et al. | 62/121 |
| 4,023,949 | 5/1977 | Schlom et al. | 62/309 |
| 4,246,962 | 1/1981 | Norback | 165/166 |
| 4,263,967 | 4/1981 | McNab et al. | 165/DIG. 8 |
| 4,296,050 | 10/1981 | Meier | 261/112 |

FOREIGN PATENT DOCUMENTS

| | | | |
|---|---|---|---|
| 2502303 | 8/1975 | Fed. Rep. of Germany | 261/112 |
| 1226259 | 3/1971 | United Kingdom | 261/112 |

OTHER PUBLICATIONS

J. D. Pescod, *Unit Air Cooler Using Plastic Heat Exchanger with Evaporatively Cooled Plates*, Australian Refrigeration, Air Conditioning and Heating, Sep. 1968, pp. 22–26.

*Primary Examiner*—Tim R. Miles
*Attorney, Agent, or Firm*—Barnes & Thornburg

[57] ABSTRACT

An evaporative cooler is disclosed which incorporates a media having a plurality of generally plate-like structures. The plates include a plurality of fins having slot-like depressions dimensioned thin enough to exhibit capillarity, yet thick enough to exhibit good heat transfer characteristics when filled with chilled water. The capillary slots are arranged to effect distribution of the water over substantially the entire surface of the plates forming the media. In one embodiment, the slot-like depressions of adjoining plates are alternately spaced, and aligning projections are provided to align adjoining plates with respect to each other.

9 Claims, 9 Drawing Figures

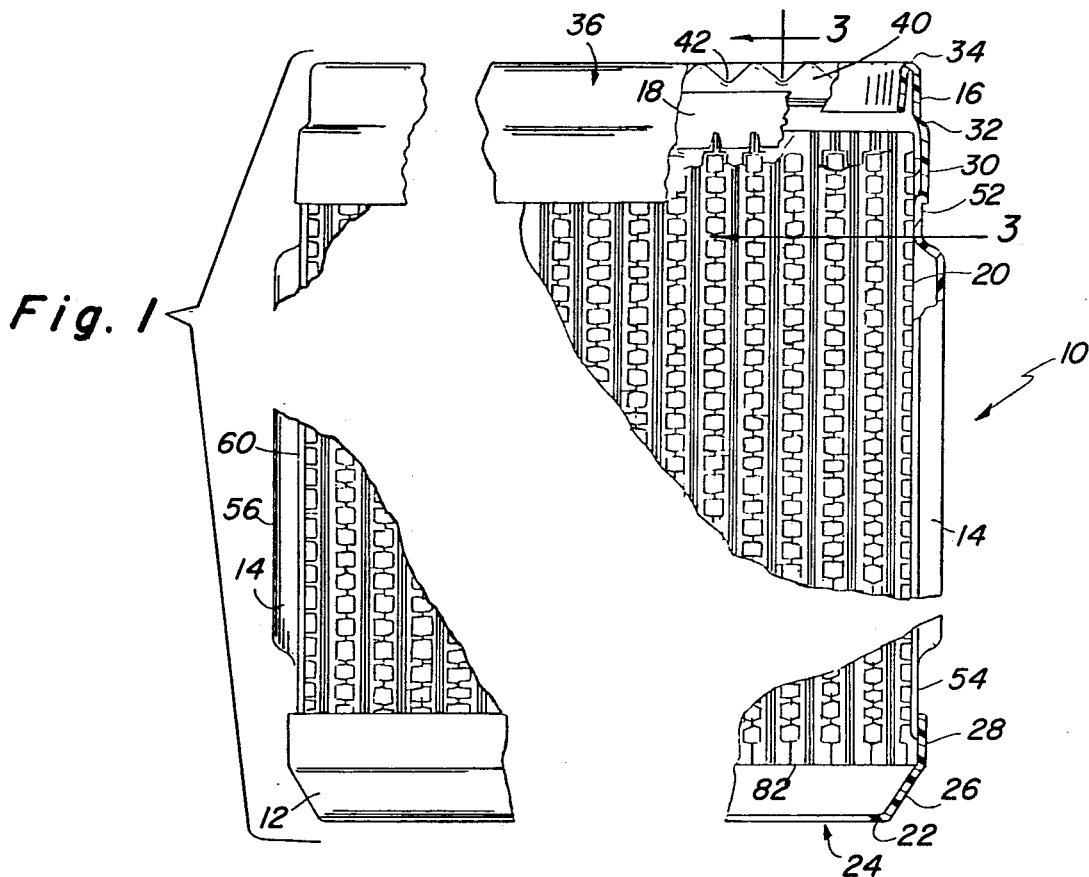
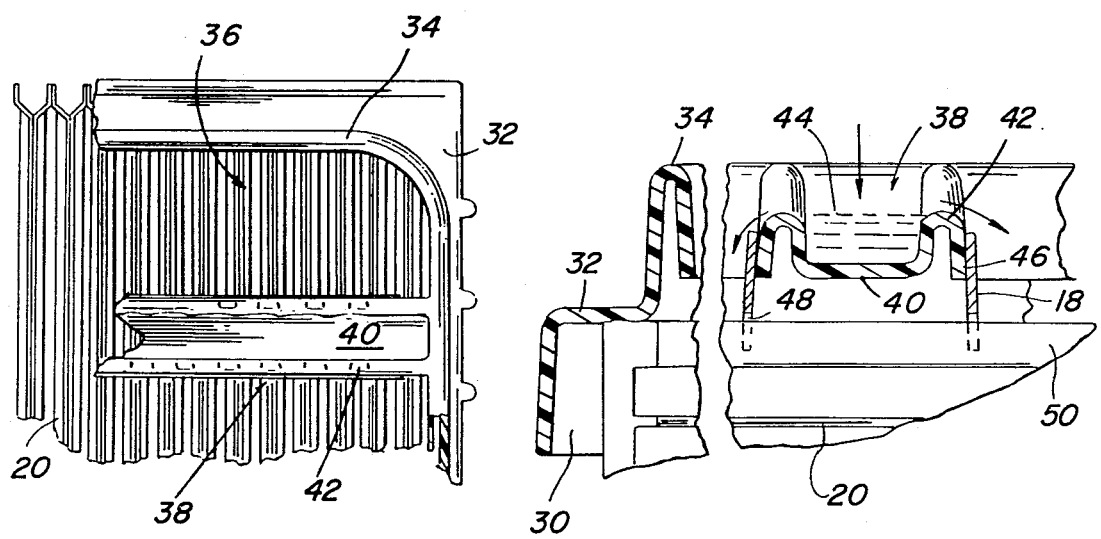
Fig. 1
Fig. 2
Fig. 3

CAPILLARY FIN MEDIA

This is a continuation-in-part of U.S. Patent application Ser. No. 479,127, filed Mar. 28, 1983.

This invention relates generally to evaporative air coolers having an integral indirect evaporative cooling stage, and more particularly to wetted surface air-to-air heat exchangers and materials for forming the same.

The principles upon which indirect evaporative coolers utilizing a wetted surface air-to-air heat exchanger operate are well known. A stream of water, preferably in sheet form, trickles down through a first channel. A current of air is blown in the same channel typically in the opposite direction of the flow of water to partially evaporate the water. As the air evaporates the water, the temperature of the unevaporated water which remains in the channel decreases. The temperature decrease of the unevaporated water in turn cools the material which defines the channel through which the water is moving. This channel is an element of the heat exchanger media, and typically consists of some sort of tube or other channel-defining structure.

A second stream of air is blown or drawn across the opposite surface of the channel-defining structure. This second stream of air is kept separate from the air and water in the first channel. The channel-defining heat exchanger media which has been cooled as described above in turn cools this second stream of air. This cooled air can then be circulated directly into a space to be cooled or circulated through a direct evaporative cooler for further cooling before circulation into the space to be cooled.

Many attempts have been made to create improvements in evaporative coolers. Particularly relevant recent improvements are disclosed in U.S. Patent application Ser. No. 444,805, filed Nov. 26, 1982. In that application, an indirect cooling unit is disclosed which comprises a plurality of pairs of opposed plates, each pair of plates forming a channel to receive the water in the first current of air referred to previously. The plates are disclosed to be embossed to form a plurality of vertically and horizontally disposed ridges which serve as spacers to maintain the plates in the desired spaced relation with respect to each other. The plates are said to be advantageously made of plastics and the ridges formed thereon by continuous extrusion, vacuum-forming, or other conventional methods. The plates are said to be treated such that one face of each plate has a wettable surface for distributing the water uniformly across the plate which will enhance the evaporation and, therefore, improve the indirect evaporative cooling effect. The recited advantages of forming the plates of plastics are low cost, light weight, cleanability, ease of replacement, and so forth.

U.S. Pat. No. 4,263,967 discloses a heat exchanger comprising a plurality of parallel plates composed of plastics. The plates include a regular pattern of conical projections extending from one side of each sheet which acts to space each sheet from the adjacent sheet. Edges of each sheet are folded to form return flanges which engage edges of an adjacent sheet to form a channel for containing the flow of air and other fluids. The transfer of heat through the sheets is generally limited by the poor heat conduction characteristics of most plastics. The effective heat transfer area of each media plate in the prior art is generally limited to the product of the exterior dimensions of each plate. The present invention is intended to achieve a substantial increase in heat transfer effectiveness without any corresponding increase in heat exchanger size. The present invention is also intended to permit the construction of smaller heat exchangers having the same heat tranfer effectiveness as much larger conventional units.

In accordance with the present invention, the plates used to form the media comprise a sheet of water-impervious material which includes a plurality of slot-like depressions dimensioned thin enough to exhibit capillarity, and thick enough to enable the slot to exhibit good heat transfer fin characteristics when filled with chilled water. The capillary fins including the slot-like depressions are preferably oriented to be generally perpendicular to the flow of the water so as to laterally distribute the water within the first channels by capillary action. The depth dimension of the capillary fins is desirably such as to maximize the heat transfer through the sheet by providing an enlarged area for heat transfer without increasing the overall dimensions of the sheet. The capillary fins have the additional advantage of increasing the rigidity of the sheets, thus making the media more form stable, and permitting a reduction in thickness of the sheets forming the media, thereby enhancing the heat conduction through the sheets. Experimental indirect cooling units employing the present invention have achieved the same heat transfer effectiveness as prior structures while using one-third less material.

In accordance with another embodiment of the instant invention, a wetted surface air-to-air heat exchanger is provided having an improved capillary system. The heat exchanger includes a first and second pair of water-impervious plates. Each pair of plates is formed by the joining together of two plates along a pair of opposed edge portions of the plates to form first channels through which air and water can flow. Each pair of plates includes means for maintaining the plates in a spaced relation, and capillary means for distributing water laterally in the first channels by capillary action. The first pair of plates are joined to the second pair of plates along a second pair of opposed edges to form a second channel through which air can pass. The capillary means comprises a series of fins formed on the plates disposed outwardly from the plates into the second channel. The fins of adjacent plates are alternately spaced. In a preferred embodiment, aligning means are provided for aligning adjoining plates with respect to each other.

One feature of the instant invention is that capillary fins are used which extend into the second channel from the plate upon which they are formed substantially to an adjoining plate. This feature has the advantage of enabling the fins to serve as spacers to maintain adjoining plates in a spaced relation. This feature also has the advantage of enabling the manufacturer to use plates which are thinner than those previously used. By using thinner plates, less material is required to make the plates, which reduces the material cost of the heat exchanger. Further, the use of thinner plates improves the heat conduction from the first channels to the second channels. This results in a greater cooling capacity for the heat exchanger. The present arrangement also results in the plates having a greater surface area, which also enhances the performance of the heat exchanger.

Another feature of the instant invention is that the capillary fins are placed in an alternating arrangement with the fins of adjoining plates. This feature has the advantage of making adjoining plates easier to align with respect to each other. By forming a plate having its first fin at a distance from the edge of the plate which differs from the distance the last fin is placed from the opposite edge of the plate, the need for forming plates having different fin placements is obviated. Plates having the same fin arrangement can be used by placing adjoining plates in a head-to-tail relation. The disclosed arrangement prevents the manufacturer from incurring tooling costs associated with forming two different molds to form the plates.

It is also a feature of the instant invention that aligning means are provided for the plates. This feature has the advantage of facilitating the alignment of the plates with respect to each other. Additionally, the engagement of the aligning means of adjacent plates retards movement of the plates with respect to each other.

These and other features of this invention and their inherent advantages will become apparent to those skilled in the art from the following description of preferred embodiments and the accompanying drawings illustrating the best mode of carrying out the invention as presently conceived wherein:

FIG. 1 is a side elevation view, partially broken away, of a wetted surface air-to-air heat exchanger constructed in accordance with the present invention;

FIG. 2 is a top plan view, partially broken away, of the heat exchanger shown in FIG. 1;

FIG. 3 is a sectional view taken along lines 3—3 of FIG. 1;

Figure 4:
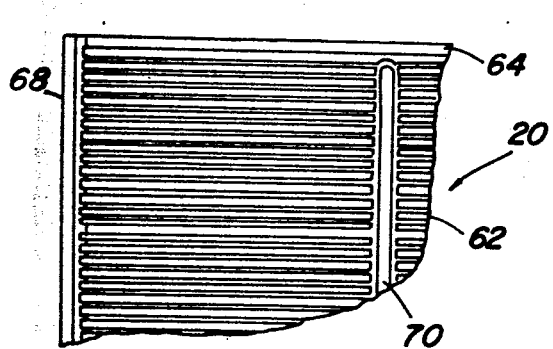
FIG. 4 is a front elevation view of a media sheet of the present invention.

A wetted surface air-to-air heat exchanger 10 constructed in accordance with the present invention comprises generally a lower collar 12, end plates 14, and an upper collar 16. Water is caused to trickle downward over water distribution skirts 18 into and through a first set of channels in the media 20, while a first flow of air is caused to flow upward through the same channels to partially evaporate the water, thereby cooling the media. A second flow of air is caused to flow through the media 20 in a direction substantially normal to the plane of FIG. 1 to be cooled by contact with the media.

The lower collar 12 as shown in FIG. 1 comprises a generally rectangular annular element having a substantially horizontal inwardly protruding lip 22 which terminates to define bottom opening 24 of the exchanger 10. An upwardly and outwardly inclined portion 26 extends between lip portion 22 and a substantially vertically projecting rim portion 28 which envelopes the lower extremities of end plates 14 and media 20.

The upper collar 16 shown in detail in FIGS. 1–3 includes a downwardly extending rim portion 30 which envelopes the end plates 14 and media 20 in a manner similar to rim portion 28 of lower collar 12. The upper collar 16 extends upwardly from the rim portion 30 to an inwardly extending step 32 which rests upon the top edge of media 20. From step 32, the upper collar extends upwardly to a perimeter-defining ridge 34 which defines the perimeter of top opening 36 of exchanger 10.

The upper collar integrally includes water distribution means 38 comprising at least one upwardly opening channel 40 including tooth-like depressions 42 on the edge of the channel 40 which direct water 44 from the channel 40 outward on either side thereof and downward to media 20. Lower outer portions of the channels 40 include water distribution skirts 18 which can be integrally formed with the channel 40 or secured to the channel 40 by a securing means 46 such as an adhesive or weld. The water distribution skirts 18 can include on a lower edge thereof slits or serrations 48 for receiving upper edges 50 of media 20.

Each end plate 14 includes a top flange 52 and a bottom flange 54 which are held within the upper collar 16 and lower collar 12, respectively. Between the top flange 52 and bottom flange 54, the end plates 14 bow outwardly from the exchanger 10 to form a substantially planar vertical outer surface 56 which can be interrupted by one or more vertically extending depressions (not shown) for strengthening and rigidifying the end plate 14. Side flanges 60 are included which define the vertical edges of the exchanger 10.

Figure 6:
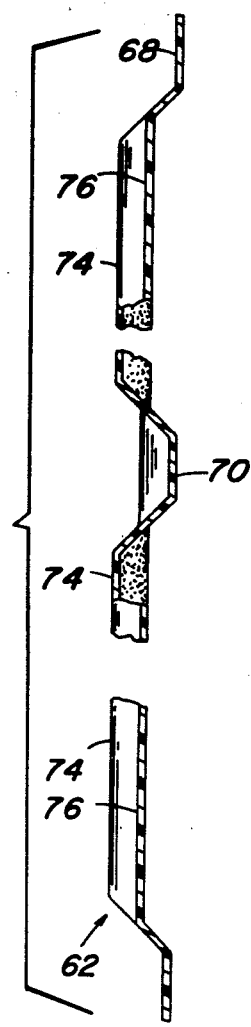
FIG. 6 is a top plan view of a media plate as viewed from line 6—6 of FIG. 5, partially broken away.
Figure 5:
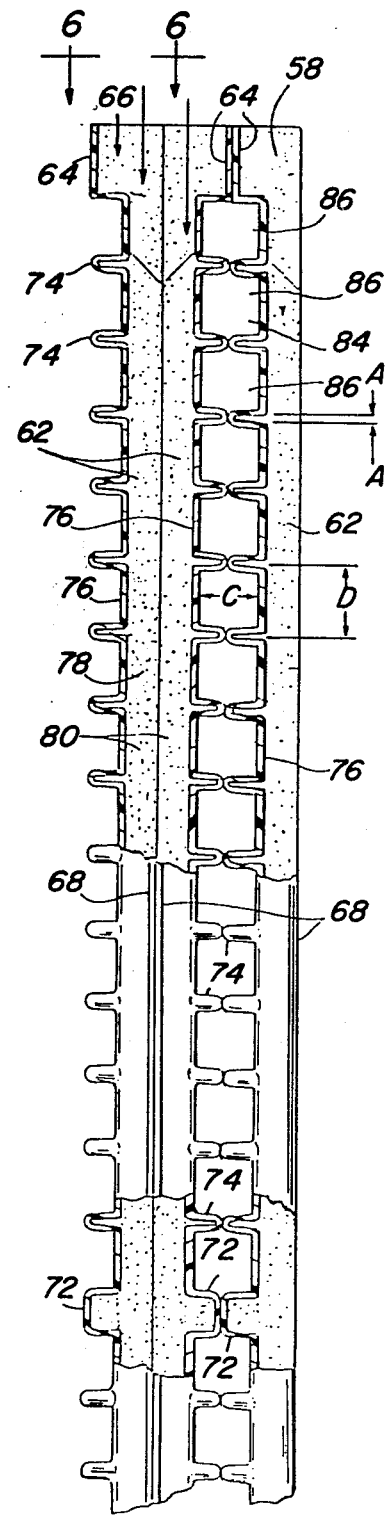
FIG. 5 is an enlarged view, broken away, of the media plate assembly used in FIG. 1.

The media 20 is shown in detail in FIGS. 4–6 to comprise a plurality of plates 62 of water-impervious material which are arranged in opposed pairs as shown in FIG. 5. Each plate 62 includes an upper flange 64 adapted to be secured to a similar upper flange of an adjacent plate 62 as shown at the top of FIG. 5. The space between non-contacting adjacent flanges 64 comprises an opening 66 through which water trickles downwardly after leaving the water distribution means 38. Each plate 62 also includes side flanges 68 adapted to be joined to a similar side flange 68 of an adjacent plate 62 to form a first set of vertically extending channels 78 through which the water proceeds downwardly and through which a first stream of air can proceed upwardly. Each sheet preferably includes one or more vertically extending depressions 70 for rigidifying the plate 62, and can also include periodic horizontally extending depressions 72 to assure the proper spacing between adjacent plates 62.

Each of the plates also includes a plurality of horizontally extending capillary fins 74 having slot-like depressions which are dimensioned to exhibit capillarity. That is, the generally horizontal slots within the capillary fins 74 have a sufficiently small vertical interior dimension A that water traveling downward through channels 70 is drawn into and caused to substantially fill the slot by capillary action. As shown in FIG. 5, the depth of the capillary fins 74 are chosen to be substantially identical to the horizontally extending reinforcing depressions 72. Further, the capillary fins 74 are spaced from each other by a distance D which, in the preferred embodiment, is approximately equal to the separation distance C between the major surfaces 76 forming channel 70. Thus, each plate 62 can be seen to include major surfaces 76 defining the boundaries of first channels 78, which major surfaces 76 are periodically interrupted by a series of horizontally extending capillary fins 74.

In the preferred embodiment, the major surfaces 76 as well as the interior of the capillary fins 74 are treated so as to exhibit enhanced wettability. This can be easily achieved by coating one side of each plate 62 with a chopped polyester fiber flocking 58 as disclosed in the previously referred-to application. The flocking 58 can most advantageously be applied to the plates 62 while they are in planar form prior to the formation of upper flanges 64, side flanges 68, depressions 70 and 72, and capillary fins 74. After the flocking or other wettability-enhancing material 58 is applied, the various flanges, depressions, fins, and channels can be formed by subjecting the planar sheet to a conventional thermoforming step.

The plates 62, once formed, can be assembled in pairs 80 with the wettability-enhanced, major surfaces 76 facing each other. The contacting side flanges 68 can be secured to each other to form the vertically extending channels 78. The pairs 80 of plates 62 can then be assembled together with adjacent pairs of plates and the pairs secured to each other along contacting upper flanges 64 and lower flanges 82.

As shown in FIG. 5, the space 84 between adjacent pairs of plates is divided by the capillary fins 74 into a plurality of parallel, vertically spaced, rectangular openings or conduits 86 through which the second stream of air is caused to flow for cooling the same. Each rectangular opening 86 of dimensions C by D is shown to be substantially completely surrounded by water which is maintained near the wet bulb temperature of the air moving in the vertical channel 78 by virtue of the evaporation occurring in the vertically extending channels 78.

Figures 7, 8:
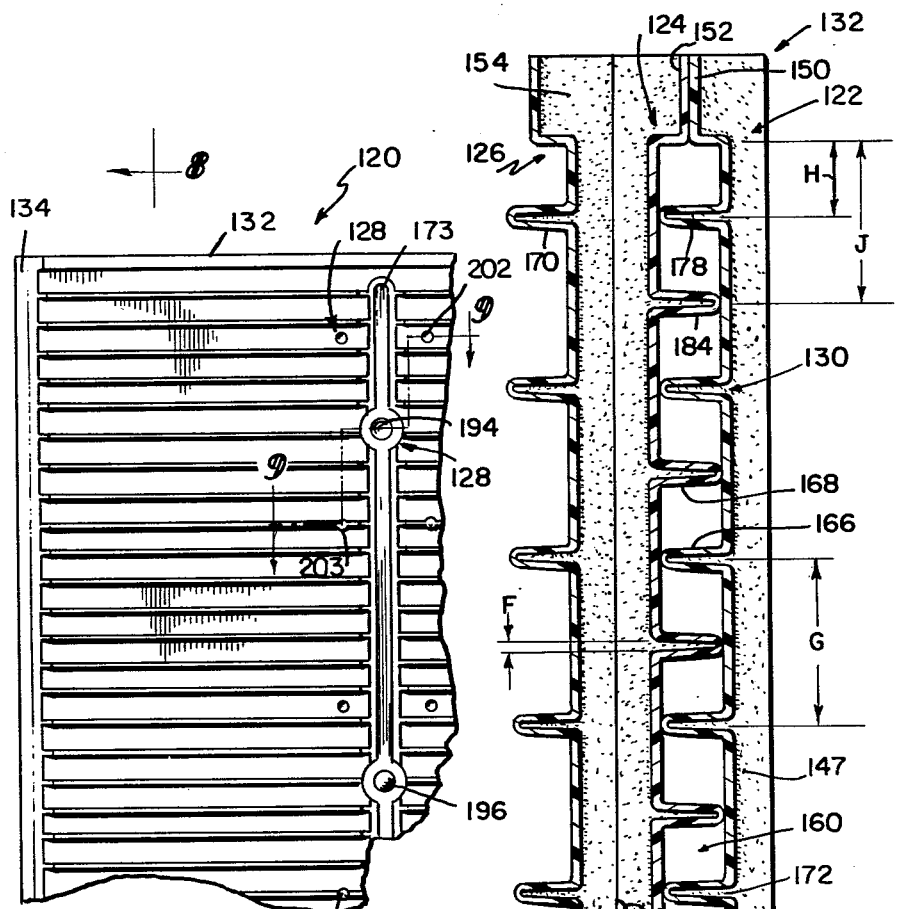
FIG. 7 is a front elevational view of a media sheet of another embodiment of the present invention.
FIG. 8 is an enlarged, cross-sectional view taken along lines 8—8 of FIG. 7.
Figure 9:
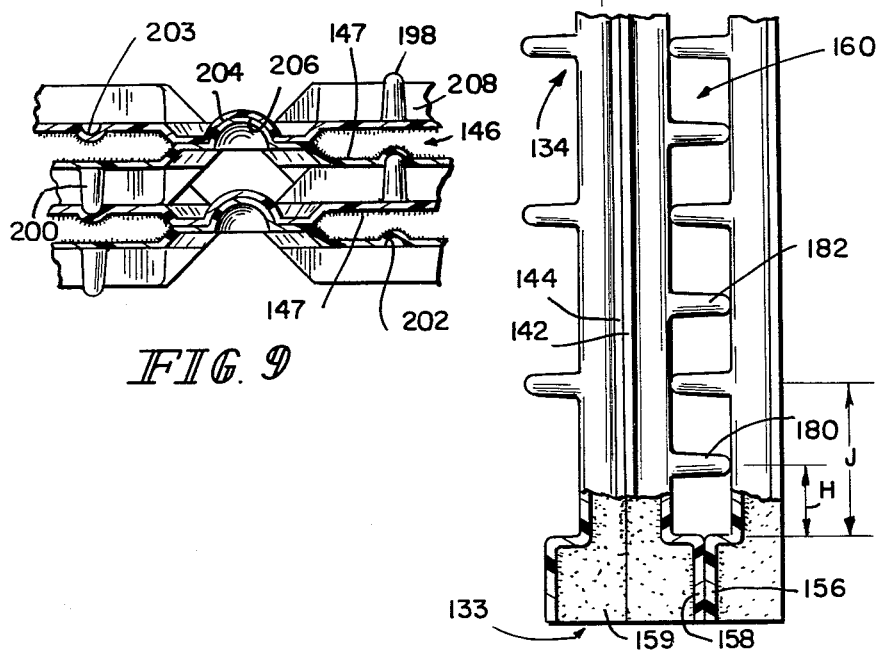
FIG. 9 is an enlarged, cross-sectional view taken along lines 9—9 of FIG. 7.

An alternate embodiment of media 20 is shown in FIGS. 7-9 wherein media 120 includes a plurality of water-impervious plates 122, 124, 126 having aligning means 128 for aligning adjoining plates 122, 124, 126 with respect to one another and capillarly means 130 for distributing water by capillary action. Media 120 includes side edge portions 134 at each side of medium 120, a top edge portion 132, and a bottom edge portion 133. Each side edge portion 134 includes a side flange such as side flanges 142, 144. Opposed side flanges 142, 144 of adjoining plates 124, 126 are joined together to form a first channel 146 through which air and water can flow. A coating 147 similar to flocking 58 (shown in FIG. 4) is added in first channel 146 to enhance wettability.

The top edge portion 132 of plates 122, 124, 126 includes top flanges 150, 152. Opposed top flanges 150, 152 of adjoining plates 122, 124 are joined together. Likewise, bottom flanges 156, 158 of adjoining plates 122, 124 are also joined together. The joining together of opposed top flanges 150, 152 and opposed bottom flanges 156, 158 forms a second channel 160 through which air can pass.

An opening 154 provided at the top of first channel 146 into which water is introduced into the first channel by means such as water distribution means 38 shown in FIG. 2. An opening 159 is provided at the bottom of first channel 146 into which air is blown countercurrently to the flow of water in the first channel 146.

Capillary means 130 includes a plurality of elongated, parallel fins 166, 168, 170. Fins 166, 168, 170 of adjoining plates 122, 124, 126 are alternately spaced. Fins 166 on plate 122 extend from the plate 122 upon which they are formed into the second channel 160 substantially to adjoining plate 124. Preferably, the fins 166, 168, 170 are disposed generally parallel to the flow of air in second channel 160. It can be appreciated that fins 166, 168, 170, when viewed from first channels 146, appear as elongated depressions having a vertical interior dimension F which is small enough to permit the fins to draw water which travels down vertical channel 173 into fins 166, 168, 170 through capillary action.

The fins 166, 168, by extending into second channel 160, form a series of subchannels 174. The use of the fins 166, 168 to divide second channel 146 into subchannels 174 increases the surface area of the plates 122, 124 which is presented to the air flowing through second channel 160, thus enhancing the cooling power of media 120.

Generally, all fins 166, 168, 170 are separated from each other by distance G. To effect an alternating arrangement of fins 166 of plate 122 with fins 168 of plate 124, plates 122, 124 are disposed in a head-to-tail relation. The first fin 178 of plate 122 and the first fin 180 of plate 124 are separated from top flange 150 and bottom flange 158, respectively, by a distance H which is approximately equal to one-half G, the normal spacing between fins. The last fin 182 of plate 122 and the last fin 184 of plate 124 are separated by a distance J which is approximately equal to distance G, the normal spacing between fins. Top flanges 150, 152 and bottom flanges 156, 158 are generally identical. By the use of this arrangement, all the plates of media 120 can be of the same size and shape. This obviates the need for manufacturing two different types of plates.

Aligning means 128 includes a series of major projections 194, 196, minor projections 198, 200, and dimples 202, 203. Major projection 194 is an outwardly protruding projection, and major projection 196 is an inwardly protruding projection. Major projections 194, 196 are preferably disposed on vertical channel 173. Major projections 194, 196 include projected surfaces 204 and dimpled surfaces 206. The projected surfaces 204 of major projections 194, 196 are sized and positioned to be received by the dimpled surfaces 206 of the major projections 194, 196 of an adjoining plate. Dimpled surfaces 206 likewise are sized and positioned to receive projected surfaces 204 of major projections 194 of an adjoining plate. Not all dimpled surfaces 206 are positioned to receive a projected surface 204. Likewise, not all projected surfaces 204 are positioned to receive a dimpled surface 206. Generally, the projected surfaces 204 and dimpled surfaces 206 engage in the first channels 146 of media 120. Thus, plate pairs such as plates 124, 126 which are joined along their side edge portions 134 are aligned by major projections 194, 196.

Plates 122, 124, 126 include outwardly disposed minor projections 198 which are sized and positioned to be received by inwardly concaved dimples 202. Inwardly projecting minor projections 200 are sized and positioned to be received by outwardly concaved dimples 203. Engagement between minor projections 198, 200, and dimples 202, 203 takes place in second channel 160 to align pairs of plates such as plates 122, 124 which are joined along their top edge portions 132 and bottom edge portions 133. Preferably, the minor projections 198, 200 are molded into the capillary fins 208 of the plates. The dimples 202, 203 in order to be positioned to receive minor projections 198, 200 are molded into the space between fins 208.

It will be appreciated by those skilled in the art that the use of capillary channels to achieve an even distribution of a film of water on the surface of the media can be advantageous in direct contact evaporative coolers as well as in the indirect coolers described herein. The capillary channels can generally be arranged substantially as shown in FIGS. 4 and 7 so as to effect distribution of the water over the entire surface of the sheet. Although the invention has been described in detail with reference to the illustrated preferred embodiment, variations and modifications exist within the scope and spirit of the invention as described and as defined in the following claims.

What is claimed is:

1. A wetted surface air-to-air heat exchanger comprising
    a first and second pair of water-impervious plates, each pair of plates being formed by the joining together of two plates along a pair of opposed edge portions of the plates to form first channels through which air and water can flow,
    each pair of plates including means for maintaining the plates in a spaced relation and capillary means for distributing water laterally in the first channels by capillary action,
    the first pair of plates being joined to the second pair of plates along a second pair of opposed edges to form a second channel through which air can pass,
    the capillary means comprising a series of fins formed on the plates and extending into the second channel, the fins of adjacent plates being alternately spaced.

2. The invention of claim 1 wherein the fins of adjoining plates are generally parallel to form a series of subchannels in the second channels, the subchannels extending in a direction generally parallel to the flow of air in the second channels.

3. The invention of claim 1 further comprising aligning means for aligning adjoining plates with respect to each other, and
    wherein the capillary means comprises a series of fins, the fins extending from the plate on which they are formed substantially to an adjoining plate.

4. The invention of claim 1 further comprising aligning means for aligning adjoining plates with respect to each other,
    the aligning means comprising at least one projection and at least one dimple, the projection being sized and positioned for being received by a dimple of an adjoining plate and the dimple being sized and positioned for receiving a projection of an adjoining plate.

5. The invention of claim 4 wherein the at least one projection includes a plurality of major projections and a plurality of minor projections, the major projections including a projected surface and a dimpled surface, the projected surface being sized and positioned for being received by a dimpled surface of an adjoining plate, and the dimpled surface being sized and positioned for receiving a projected surface of an adjoining plate.

6. The invention of claim 1 wherein said capillary means comprises a series of parallel fins formed on the plates and disposed from the plates into the second channel, the fins of adjacent plates being alternately spaced to form a series of subchannels in the second channel, the subchannels extending in a direction generally parallel to the flow of air in the second channels, and the fins extending from the plate on which they are formed substantially to an adjoining plate.

7. In an indirect evaporative air cooler through which a first and second stream of air can pass for cooling the second stream of air, including means for distributing a cooling liquid to contact the first stream of air, an improved media comprising a plurality of plates, each plate having a series of ridges to maintain adjacent plates in a spaced relation, the plates being joined together to form a series of first channels through which the cooling liquid and the first stream of air can pass, and a series of second channels through which the second stream of air can pass, each plate having a plurality of elongated depressions having a sufficiently small dimension across the depressions so as to exhibit capillarity, the elongated depressions forming elongated fins extending to the second channel,
    the elongated depressions of adjoining plates being alternately spaced to form a series of subchannels in the second channel.

8. The invention of claim 7 wherein the elongated fins in the second channel formed by the elongated depressions extend from the plate on which they are formed substantially to an adjoining plate, the subchannels extending in a direction generally parallel to the flow of air in the second channels.

9. A wetted surface air-to-air heat exchanger comprising
    a first and a second pair of water-impervious plates, each pair of plates being formed by the joining together of two plates along a pair of opposed edge portions of the plates to form first channels through which air and water can flow,
    each pair of plates including means for maintaining the plates in a spaced relation, capillary means for distributing water laterally in the first channels by capillary action, and aligning means for aligning adjoining plates with respect to each other,
    the first pair of plates being joined to the second pair of plates along a second pair of opposed edges to form a second channel through which air can pass,
    the capillary means comprising a series of parallel fins formed on the plates and disposed from the plates into the second channel substantially to an adjoining plate, the fins of adjacent plates being alternately spaced to form a series of subchannels in the second channel, the subchannels extending in a direction generally parallel to the flow of air in the second channels,
    the aligning means comprising at least one inwardly protruding projection and at least one outwardly protruding projection at at least one inwardly protruding dimple and at least one outwardly protruding dimple, the projections being sized and positioned for being received by dimples of an adjoining plate, the dimples being sized and positioned for receiving projections of an adjoining plate.

* * * * *